United States Patent [19]

Lindee

[11] Patent Number: 5,149,298

[45] Date of Patent: Sep. 22, 1992

[54] VERTICAL VALVE FOOD PATTY MOLDING MACHINE

[75] Inventor: Scott A. Lindee, New Lenox, Ill.

[73] Assignee: Formax, Inc., Mokena, Ill.

[21] Appl. No.: 806,312

[22] Filed: Dec. 13, 1991

[51] Int. Cl.$^5$ .............................................. A22C 7/00
[52] U.S. Cl. .................................. 452/174; 426/513
[58] Field of Search ................. 452/174, 42; 425/236, 425/147, 240, 241; 426/513

[56] References Cited

U.S. PATENT DOCUMENTS

| Re. 30,096 | 9/1979 | Richards | 452/174 |
|---|---|---|---|
| 3,964,127 | 6/1976 | Holly | 426/513 |
| 4,054,967 | 10/1977 | Sandberg et al. | 452/174 |
| 4,182,003 | 1/1980 | Lamartino et al. | 452/174 |
| 4,356,595 | 11/1982 | Sandberg et al. | 452/174 |
| 4,363,822 | 12/1982 | Kleptz | 426/513 |
| 4,597,135 | 7/1986 | Holly et al. | 426/513 |
| 4,697,308 | 10/1987 | Sandberg | 452/174 |
| 4,872,241 | 10/1989 | Lindee | 452/174 |
| 5,021,025 | 6/1991 | Wagner | 452/174 |
| 5,030,164 | 7/1991 | Wagner | 452/174 |

Primary Examiner—Willis Little
Attorney, Agent, or Firm—Kinzer, Plyer, Dorn, McEachran & Jambor

[57] ABSTRACT

A high speed food patty molding machine capable of handling whole-fiber food products has two food pumps, each pump having a cavity with an inlet at once end, an outlet at the other end, and a plunger movable through the cavity. The two pump cavities are located adjacent to each other and separated by a common wall; a moldable food product is supplied into the inlet of each pump cavity. A manifold connects the outlets of the two pump cavities to a molding mechanism; a pump drive reciprocates the pump plungers in overlapping alternation and a valve seals off the outlet of each pump cavity whenever the plunger of that pump is moving toward its retracted refill position, so that there is a continuous pressurized supply of food product to the molding mechanism. Each pump cavity outlet is located at the juncture of the cavities common separation wall and the discharge end of its cavity. The outlets merge to form a common inlet to center of the manifold. A rotary valve member in the manifold inlet is reciprocally rotated between one operating position in which one pump cavity outlet is closed and the other pump cavity outlet is opened and another operating position in which the pump cavity outlet conditions are reversed. the food product must make a greater change of direction to flow to the portion of the manifold closer to the open outlet than to the portion of the manifold farther away from that outlet.

12 Claims, 3 Drawing Sheets

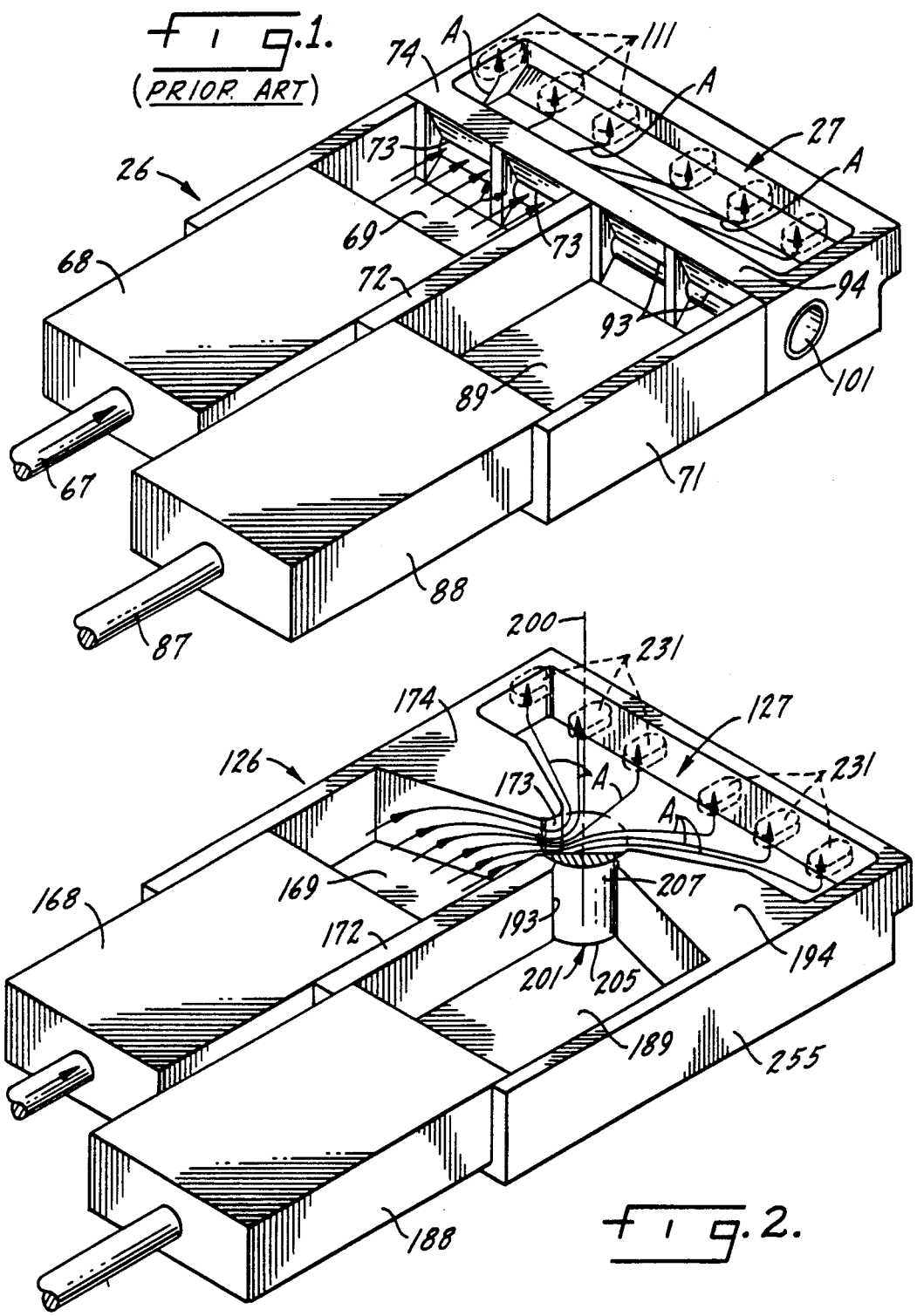

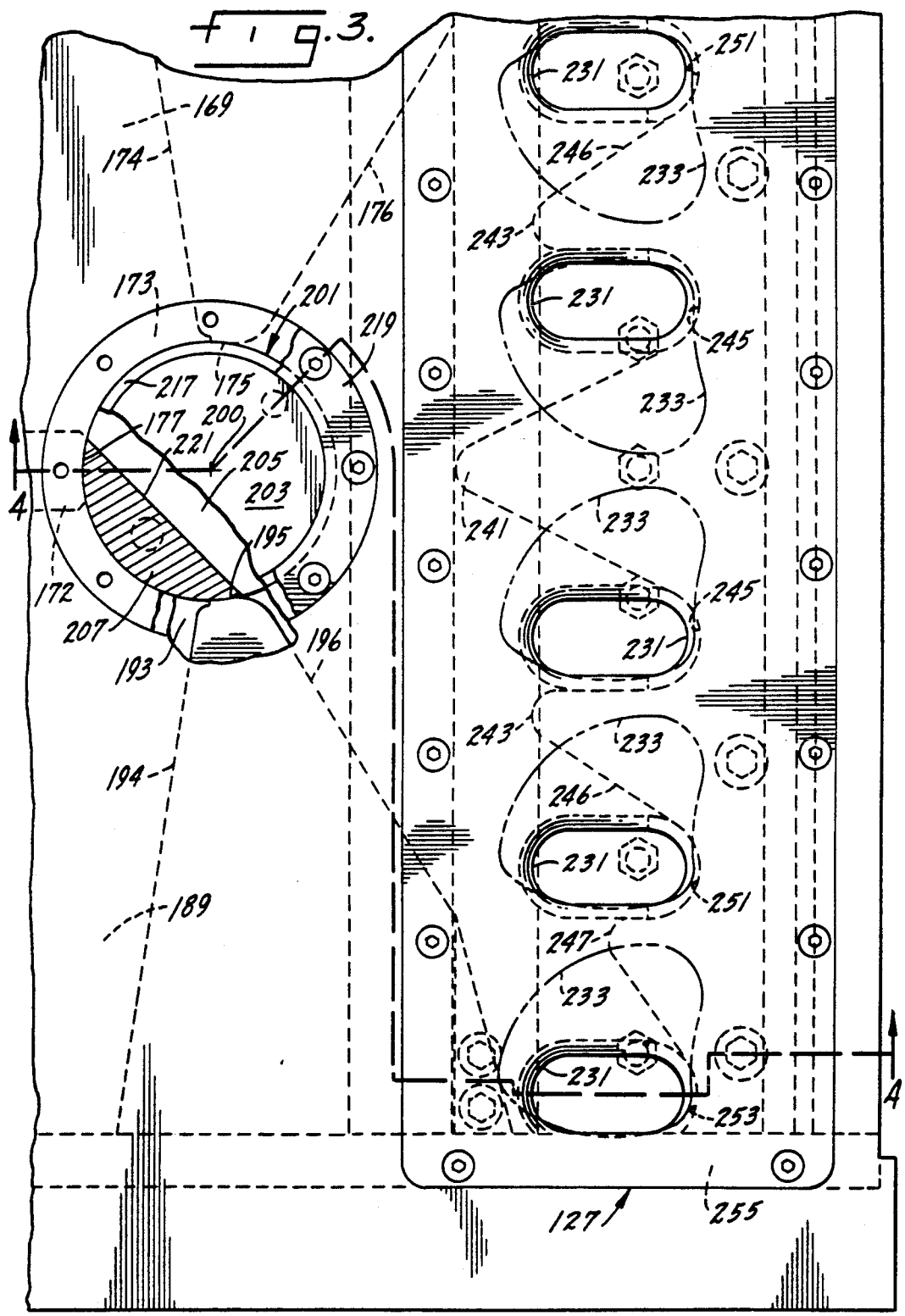

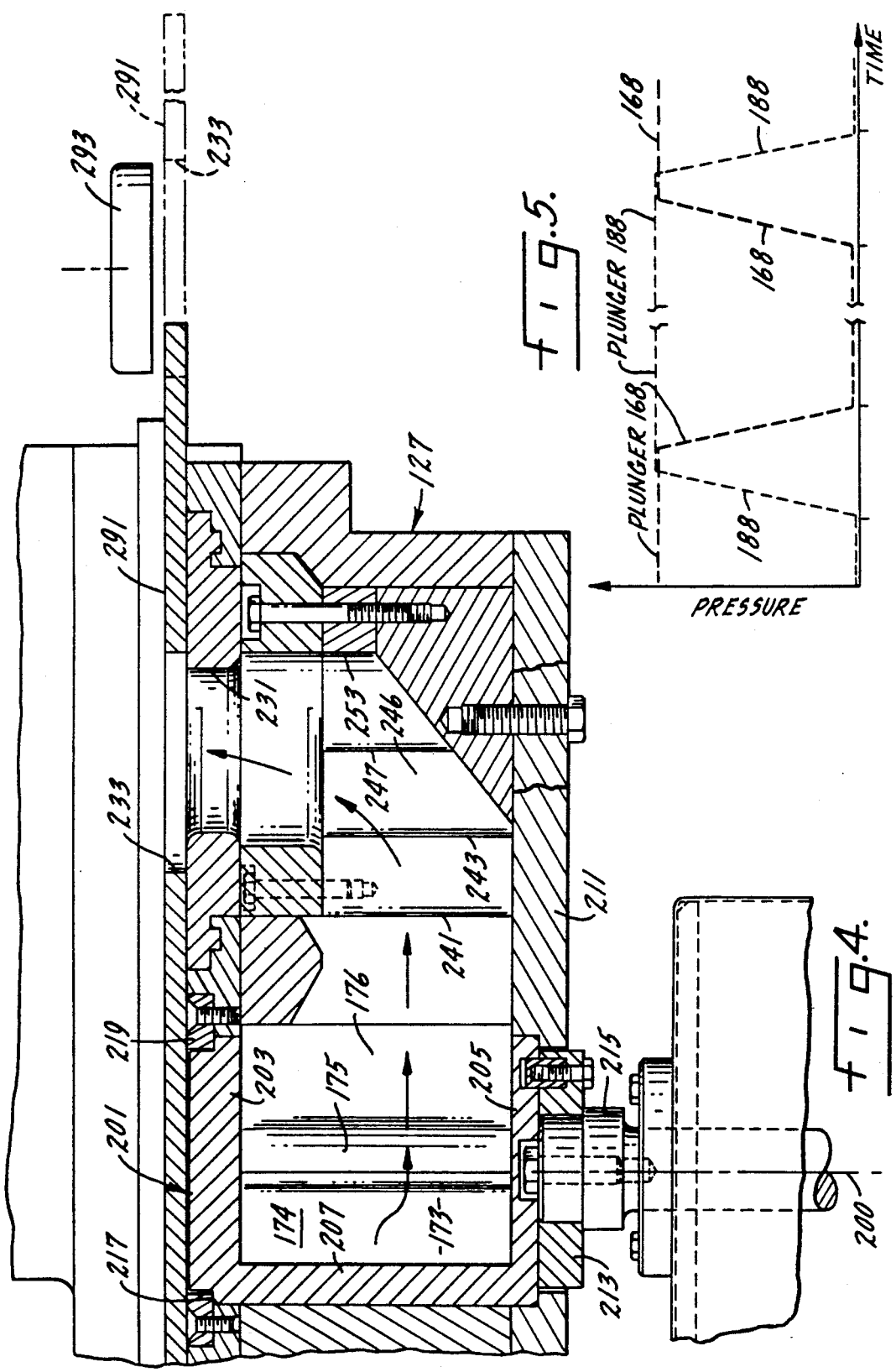

VERTICAL VALVE FOOD PATTY MOLDING MACHINE

BACKGROUND OF THE INVENTION

Food patties of various kinds, including hamburgers, molded "steaks", fish cakes, poultry patties, pork patties, and various vegetable patties are frequently molded in high volume automated molding machines Patty molding machines successfully adaptable to the forming of any of these food products are described in Richards Reissue U.S. Pat. No. Re. 30,096, reissued Sep. 18, 1979; Sandberg et al U.S. Pat. No. 4,054,967, issued Oct. 25, 1977; LaMartino et al U.S. Pat. No. 4,128,003, issued Jan. 8, 1980; Sandberg et al U.S. Pat. No. 4,356,595, issued Nov. 2, 1982; Sandberg U.S. Pat. No. 4,697,308, issued Oct. 6, 1987 and Lindee U.S. Pat. No. 4,872,241, issued Oct. 10, 1989.

Although any of these machines, and others as well, are capable of producing food patties of consistent size, weight and configuration on a high volume basis, substantial problems may be encountered when the machines are required to mold patties from food products which, unlike hamburger, have not been ground to relatively small particle size. Thus, it may be desirable to form patties from a food product that has not been chopped or ground; the starting material may consist of whole poultry breasts, large segments of pork or other meat, large fish fillets, or relatively large pieces of almost any food product that has an appreciable fiber content. Even in those machines specifically adapted to processing whole-fiber food products (e.g., Sandberg U.S. Pat. No. 4,697,308) maintenance of good texture in the finished patties may be a continuing problem.

The molding mechanism of the Richards reissue U.S. Pat. No. Re. 30,096, also used in the specific machine illustrated in Sandberg U.S. Pat. No. 4,697,308, utilizes a horizontally oriented manifold valve cylinder having two longitudinally displaced inlet slots which are alignable with respective outlet slots of two of side-by-side food pump cavities. The manifold valve cylinder has an elongated outlet slot which is angularly skewed longitudinally of the manifold valve cylinder to control the outlet pressure from the manifold to a molding mechanism. In later modifications of this molding mechanism, which are shown in U.S. Pat. Nos. 4,356,595; 4,697,308 and 4,872,241, the elongated outlet slot from the manifold valve cylinder to the mold cavities is angularly enlarged to better handle fibrous food products containing large pieces with minimum deterioration of the large pieces and with no more than minimum distortion of the food patties when later cooked. The flow path of the food product through the modified manifold valve cylinder, whether ordinary hamburger or a high-fiber product, still requires a reversal of the direction of flow of the food product as one pump cavity outlet is closed by rotation of the manifold valve cylinder and the other outlet is opened, because each outlet discharges directly into only one end of the manifold valve cylinder, the end adjacent to its cavity.

The rotation of the manifold valve cylinder to open and cylinder to open and close the pump cavity outlets tends to reduce the muscular texture of large pieces of a fibrous food product, due to shearing of these large pieces. The relatively small inlet and outlet openings in the manifold valve cylinder may create a large pressure drop as food products are pumped through this valve. Another problem which occurs because of the use of the relatively small inlet and outlet openings in the manifold valve cylinder is the tendency of large segments, in fibrous food products, to clog the manifold valve cylinder because of the inability to easily pass through these openings. Other operating problems with this basic mechanism may include undue "working" of the food product due to repeated reversals in flow direction, a need for higher pump pressures than desirable, and a tendency for some part of the food product to remain stationary or "freeze" in the manifold valve cylinder.

SUMMARY OF THE INVENTION

It is a principal object of the present invention, therefore, to provide a new and improved fibrous food product manifold and valve construction for a food patty molding mechanism that effectively minimizes the problems and difficulties heretofore described.

Another object of the invention is to provide outlets for the food pump cavities of a molding mechanism that are adjacent to each other and discharge into the center of a mold plate manifold to minimize or eliminate reverse flow of the food product in the manifold as the outlet from one food pump cavity closes and the other opens.

Yet another object of the invention is to provide a manifold inlet valve which affords a practically unobstructed passage for each pump outlet to discharge food product directly to an end of the manifold remote from the pump outlet.

Still another object of the invention is to provide a manifold for a food patty molding mechanism that has diverging walls leading from its inlet valve to the filling ports of the mold mechanism and has walls that direct the flowing food product more efficiently to those mold filling ports.

Accordingly, the invention relates to a high speed food patty molding machine comprising a food product molding mechanism and two food pumps, each pump comprising a cavity of predetermined width having an inlet and an outlet at opposite ends of the cavity and a plunger movable between a retracted position and a pressure position in which the plunger is advanced into the cavity. The pump cavities are located side-by-side with a common wall separating them. A supply means is provided for supplying moldable food product into the inlet of each pump cavity; a manifold connects the outlets of the two pump cavities to the molding mechanism, the manifold extending across the outlet ends of the pump cavities. Pump drive means are provided for driving the pump plungers in overlapping alternation so that at least one pump cavity always contains moldable food product under pressure. Valve means are provided for sealing off the outlet of each pump cavity from the manifold whenever the plunger for that pump is moved towards its retracted position, affording a continuous pressurized supply of moldable food product to the molding mechanism. In the improved manifold and valve means of this invention, each pump cavity outlet is located at the juncture of the common cavity wall and the discharge end of its cavity outlet, the two outlets merging to form a common inlet to the manifold. A rotary valve member is positioned in the manifold inlet and is reciprocally rotatable between one operating position in which one cavity outlet is closed and the other is open to the manifold inlet and another operating position in which the one pump cavity outlet is open and the other is closed.

BRIEF DESCRIPTION OF THE DRAWINGS

FIG. 1 is a perspective view of a prior art food pump and manifold assembly, with some parts omitted for clarity of illustration;

FIG. 2 is a view similar to FIG. 1 showing one embodiment of the food pump, manifold valve and manifold assembly of this invention;

FIG. 3 is an enlarged, partially sectional, plan view of the food pump cavities, manifold valve, manifold, mold cavities filling ports and mold cavities of a food patty molding machine incorporating this invention;

FIG. 4. is a sectional view taken approximately along lines 4—4 of FIG. 3; and

FIG. 5 is a chart showing the variations in pressure on the fibrous food products during alternate actuation of the two food pump plungers.

DESCRIPTION OF THE PREFERRED EMBODIMENT

FIG. 1 illustrates a food pump system 26 of the type shown and described in Richards U.S. Pat. No. Re. 30,096 which machine has been marketed for many years as the Formax F-26 machine of Formax, Inc. of Mokena, Ill. The disclosure of the Richards U.S. reissue patent is incorporated herein by reference and familiarity with it is assumed.

The food pump system 26 is supplied with ground meat or other food product from a hopper that opens into the intake of the food pump system. The food pump system 26 includes two pump plungers 68 and 88 driven by piston rods 67 and 87 actuated by hydraulic cylinders (not shown). Plungers 68 and 88 are reciprocated in overlapping alternation in two pump cavities 69 and 89, respectively, of a pump cavity enclosure 71. The pump cavity enclosure 71 is divided into the two cavities 69 and 89 by a central divider wall 72. The forward ends of the cavities 69 and 89 are closed by end walls 74 and 94, respectively, which in the embodiment shown in FIG. 1 is a unitary wall. Relatively narrow slots 73 and 93 are formed, respectively, in each of the end walls 74 and 94. The slots 73 and 93 feed a manifold valve cylinder 101 which is horizontally mounted in manifold 27.

The valve cylinder 101 includes longitudinally displaced inlet slots (not shown), alignable with the outlet slots 73 and 93, respectively. Cylinder valve 101 also has an outlet slot (not shown), which delivers food product to fill ports 111 leading to mold cavities in a mold plate; again, the mold cavities and mold plate are not illustrated.

The food pump mechanism 26 is well known in the art from the aforementioned reissue patent to Richards and from the Formax F-26 patty molding machines manufactured and sold by Formax, Inc. of Mokena, Ill. This food pump mechanism is subject to the problems referred to above.

FIGS. 2, 3, 4 and 5 illustrate a modification of the food pump mechanism 26 that incorporates features of the present invention. In the modified food pump mechanism 126, FIG. 2, the mold cavities 169 and 189 are separated by a central divider wall 172 which terminates short of the forward end walls 174 and 194 of the cavities. The forward end walls 174 and 194 of the cavities are inclined to converge at the divider wall 172, but terminate short of wall 172 to form adjacent discharge openings 173 and 193 at the center of a manifold 127. End walls 174 and 194 terminate in arcuate noses 175 and 195, respectively, shown most clearly in FIG. 3 of the drawings, with each nose blending, respectively, into diverging walls 176 and 196 leading into the manifold 127. The divider wall 172 between the cavities 169 and 1893 also terminates in a nose 177 which is slightly concave; see FIG. 3. Plungers 168 and 188 reciprocate in alternation in the pump cavities 169 and 189.

As can be seen most clearly in FIGS. 2-4 a rotary valve member 201 is mounted at the convergence of noses 175, 177 and 195. Valve member 201 rotates about a vertical axis 200 to open and close communication between the pump cavities 169 and 189 and the manifold 127. Valve member 201 has a top wall 203, a bottom wall 205 and a partial circumferential side wall 207, preferably a circular arc, joining the top and bottom walls. The side wall 207 has a sufficient circumferential extent to close either discharge opening 173 or 193 at any one time as can be clearly seen in FIGS. 2 and 3 in which the discharge opening 193 from the pump cavity 189 is blocked but the outlet 173 of pump cavity 173 is open. The bottom wall 205 of the valve member 201 is journalled in a base plate 211 that is a part of the manifold 127 and is attached to a disk 213 which is in turn connected to a shaft 215 which is reciprocated angularly to rotate the valve member 201 between alternate positions, closing and opening the outlet openings 173 and 193 of the pump cavities 169 and 189 in alternation. The top wall 203 of the cylindrical valve is formed with a step 217 which is journalled in a ring 219 bolted to the manifold 127.

Thus, the valve member 201 is reciprocally rotatable between two operating positions which alternately open one pump cavity outlet, such as outlet 173, and close the other pump cavity outlet, such as outlet 193, and vice versa. In the positions shown in FIGS. 2, 3 and 4 of the drawings, the arcuate wall 207 of the valve 201 closes the discharge outlet 193 of the pump cavity 189 and provides an unobstructed passage from discharge outlet 173 of the pump cavity 169 into the manifold 127. When the valve member 201 is rotated to its other position (about 90° in the illustrated embodiment) the arcuate wall 207 closes the discharge outlet 173 of the pump cavity 169 and provides an unobstructed passage from discharge outlet 193 of the pump cavity 189 into manifold 127. In either operating position of the valve, the flat chordal surface 221 of arcuate wall 207 of valve 201 provides a smooth continuity between the nose 177 of central divider wall 172 and one or the other of the diverging walls 176 and 196 of the manifold 127, thereby permitting an unobstructed flow of food product from either one of the pump cavity discharge outlets 173 and 193 into the manifold 127.

It should be noted that because of the central location of the pump cavity discharge outlets 173 and 193 and the canted alignment of discharge of each outlet relative to the manifold 127, each pump cavity discharge outlet has almost a straight line of discharge flow into the end of the manifold 127 which is not immediately adjacent its pump cavity; the path of travel of food product from a pump outlet to the end of the manifold 127 opposite its pump cavity requires a slight turn in direction of flow. This pattern of flow of the fibrous food products from the pump cavity discharge outlets 173 and 193 (see arrows A in FIG. 2) virtually eliminates the problem of reverse flow of food product in the manifold 127 in those intervals when the arcuate wall 207 of the control valve member 201 is reciprocated to open one discharge outlet and close the other. Further, because the food product does not experience a change in direction of flow as it passes valve member 201 into manifold 127, as was the case with previous horizontally oriented manifold cylindrical valves, there is an apparently lower pressure drop through the manifold inlet valve and less tendency for large segments of the food product to clog the manifold inlet. The tendency to clog the vertical cylindrical valve of this invention is eliminated in comparison with previously used horizontal valves because the passage adjacent the flat chordal surface 221 of the arcuate wall is essentially unrestricted.

To more efficiently direct the flow of food product from the vertical valve member 201 to the filling ports 231, which are located at the top of the manifold 127 (FIGS. 2-4) and to fill the mold cavities 233 (FIGS. 3, 4) of the mold plate 291 (FIG. 4), the wall of the manifold located opposite to the diverging walls 176 and 196 is formed with horizontally extending peaks and valleys facing the valve member 201, as shown in FIGS. 3 and 4. These peaks and valleys form channels that direct the fibrous food products from the cylindrical valve 201 to the filling ports 231. The centrally positioned horizontally extending peak 241 is located directly opposite the valve member 201 and extends the greatest horizontal distance towards the pump cavity discharge outlets 173 and 193. A pair of peaks 243 of mirror image asymmetrical shapes are positioned on opposite sides of the central peak 241 to form valleys 245, with a filling port 231 located above each valley. The walls of the peaks 243 which face the peak 241 extend generally at right angles to the longitudinal side of the manifold 127 while the outer walls 246 of the peaks 243 are inclined to the longitudinal wall of the manifold. Peaks 243 extend a shorter horizontal distance towards the valve 201 than does the central peak 241. The outermost peaks 247 form pockets or valleys 251 with their adjacent peaks 243. A filling port 231 is located above each pocket or valley 251. Valleys 253 are formed between the peaks 249 and the end walls 255 of the manifold. Each peak other than the central peak 241 has an inwardly facing straight wall and an outwardly facing inclined wall to form channels or valleys with the walls of adjacent peaks to direct the flow of fibrous products to the filling ports 231 with a minimum of resistance to flow and a minimum tendency for reverse flow. The channels or valleys between the adjacent peaks lie generally on a straight line relative to one of the discharge outlets 173 or 193 from the pump cavities 169 and 189 respectively.

As can be best seen in FIG. 4, the mold cavities 233 are formed in a mold plate 291 which is reciprocally mounted for movement from left to right as viewed in FIG. 4. The mold plate 291 is shown in its discharge position in phantom lines to the right of FIG. 4. In the discharge position, the mold cavities 233 align with knockout cups 293 of the same shape as the mold cavities. The knockout cups 293 move up and down to knock a patty out of the mold cavity 233 for movement away from the molding mechanism.

FIG. 5 of the drawings is a chart showing how the movement of pump cavity plungers 168 and 188 maintains pressure on the food product in the manifold 127. Plunger 168 is exerting maximum pressure on the food product in its cavity 169 and continues to maintain this pressure as plunger 188 reaches its maximum pressure. Shortly after plunger 188 starts to exert its maximum pressure, plunger 168 is withdrawn to refill its pump cavity with food product and the pressure in its cavity drops to its minimum, effectively zero. This cycle continues as plunger 168 again starts to increase pressure and reaches its maximum pressure slightly before plunger 188 is retracted to reduce the pressure it exerts against the food product and permit refilling of its pump cavity 189. Thus, with the overlap of the food plungers a substantially constant pressure is maintained on the fibrous food products in manifold 127.

I claim:

1. In a high speed food patty molding machine comprising:

a food product molding mechanism;

two food pumps, each pump comprising a cavity of predetermined width having an inlet at one end, an outlet at the other end, and a plunger movable between a retracted position and a pressure position in which the plunger is advanced into the cavity toward the outlet, the pump cavities being located adjacent to one another and separated by a common wall;

supply means for supplying moldable food products into the inlet of each pump cavity, a manifold connecting the outlets of the two pump cavities to the molding mechanism with the manifold extending across the outlet ends of the pump cavities, pump drive means for driving the pump plungers in overlapping alternation so that at least one pump cavity always contains moldable food product under pressure, and valve means for sealing off the outlet of each pump cavity from the manifold whenever the plunger for that pump is moving toward its retracted position, affording a continuous pressurized supply of moldable food product to the molding mechanism, the improved manifold and valve means comprising:

each pump cavity outlet located at the juncture of said cavity common separation wall and the discharge end of its cavity with the outlets merging to form a common manifold inlet to the manifold; and a rotary valve member positioned in the manifold inlet and reciprocally rotatable between one operating position in which one pump cavity outlet is closed and the other pump cavity outlet is open to the manifold inlet and another operating position in which the one pump cavity outlet is open and the other pump cavity outlet is closed to the manifold inlet.

2. The manifold and valve means for a food patty molding machine as in claim 1, in which each pump cavity outlet discharges towards an end of the manifold remote from its pump cavity, and in which the manifold has diverging walls that extend from the manifold inlet into the manifold.

3. The manifold and valve means for a food patty molding machine as in claim 1, in which each pump cavity outlet discharges into the manifold in a direction such that the food product entering the manifold must make a greater change of direction to flow to the portion of the manifold closer to the outlet than to flow into the portion of the manifold farther away from the outlet.

4. The manifold and valve means for a food patty molding machine as in claim 1, in which the rotary valve member rotates about a vertical axis.

5. The manifold and valve means for a high speed food patty molding machine of claim 4, in which the rotary valve member has a closing wall with a circumferential extent which is less than the open circumferential extent of the rotary valve member.

6. The manifold and valve means for a food patty molding machine of claim 3, in which the manifold has an undulating wall forming plural horizontally extending peaks and valleys located opposite the rotary valve member to channel the flow of food product in the manifold.

7. The manifold and valve means for a food patty molding machine as in claim 6, in which the manifold includes a mold cavity outlet aligned with each valley in the undulating wall.

8. A manifold valve assembly for a high speed food patty molding machine including:
   a manifold inlet including a pair of opposed wall edges defining a passage therethrough;
   a pair of adjacent pump cavity outlets, each outlet defined by the edge of a common dividing wall of two pump cavities and one of the opposed wall edges of the manifold inlet;
   a rotary valve member positioned at the juncture of the opposed wall edges and the common dividing wall edge for rotation about an axis extending longitudinally of the valve member;
   the valve member having a partial circumferential wall with a circumferential extent sufficient to close a pump cavity outlet, and
   means to rotate the valve member between a first position in which the partial circumferential wall closes one of the pump cavity outlets and opens the other pump cavity outlet and a second position in which the partial circumferential wall opens one of the pump cavity outlets and closes the other pump cavity outlet.

9. The manifold valve assembly of claim 8 in which the partial circumferential wall has a circumferential extent less than 180°.

10. The manifold valve assembly of claim 8 in which the partial circumferential wall has the shape of a segment of a circle with a chordal interior wall, which chordal interior wall provides a smooth transition between the common dividing wall edge and one of the oppositely opposed wall edges.

11. The manifold valve assembly of claim 8 in which the manifold has an undulating wall forming plural horizontally extending peaks and valleys located opposite the rotary valve member to channel the flow of food product in the manifold.

12. The manifold valve assembly of claim 11 in which the manifold includes a mold cavity outlet aligned with each valley in the undulating wall.

* * * * *